United States Patent [19]

Yoshida et al.

[11] Patent Number: 5,553,579
[45] Date of Patent: Sep. 10, 1996

[54] FUEL INJECTION SYSTEM FOR TWO-CYCLE ENGINE

[75] Inventors: Takao Yoshida; Suzuki Takhiro; Hirai Ryoichi, all of Iwata, Japan

[73] Assignee: Yamaha Hatsudoki Kabushiki Kaisha, Iwata, Japan

[21] Appl. No.: 362,799

[22] Filed: Dec. 22, 1994

[30] Foreign Application Priority Data

Dec. 28, 1993 [JP] Japan ................... 5-336428

[51] Int. Cl.⁶ ................ F02D 9/08; F02B 17/00
[52] U.S. Cl. .............. 123/295; 123/73 C; 123/299; 123/336
[58] Field of Search ............... 123/73 C, 295, 123/299, 305, 308, 336, 430, 432

[56] References Cited

U.S. PATENT DOCUMENTS

| | | | |
|---|---|---|---|
| 1,988,754 | 1/1935 | Sleffel | 123/299 X |
| 3,554,170 | 1/1971 | Schenk et al. | 123/305 |
| 3,621,821 | 11/1971 | Jarnuszkiewicz | 123/300 |
| 3,759,232 | 9/1973 | Wahl et al. | 123/683 |
| 3,977,367 | 8/1976 | Roberts | 123/206 |
| 4,111,177 | 9/1978 | Regueiro | 123/295 |
| 4,207,856 | 6/1980 | Sugasawa et al. | 123/198 F |
| 4,484,551 | 11/1984 | Choma et al. | 123/336 |
| 4,550,701 | 11/1985 | Suzuki et al. | 123/436 |
| 4,616,621 | 10/1986 | Kuroiwa et al. | 123/585 |
| 4,686,941 | 8/1987 | Ariga | 123/26 |
| 4,699,113 | 10/1987 | Chen | 123/587 X |
| 4,790,270 | 12/1988 | McKay et al. | 123/305 X |
| 4,852,525 | 8/1989 | Ishida | 123/256 |
| 4,932,371 | 6/1990 | Albertson et al. | 123/73 SP |
| 4,974,565 | 12/1990 | Hashimoto et al. | 123/299 |
| 5,249,557 | 10/1993 | Katoh et al. | 123/305 |
| 5,257,607 | 11/1993 | Gillespie | 123/73 C X |
| 5,394,846 | 3/1995 | Jaeger et al. | 123/336 |

FOREIGN PATENT DOCUMENTS

| | | |
|---|---|---|
| 0302045 | 2/1989 | European Pat. Off. . |
| 723972 | 2/1955 | United Kingdom . |
| 2199617 | 7/1988 | United Kingdom . |
| 2215398 | 9/1989 | United Kingdom . |
| 8700575 | 1/1987 | WIPO . |

OTHER PUBLICATIONS

Patent Abstracts of Japan, vol. 9, No. 162 (M–394), 6 Jul. 1985, abstract of JP-A-60 035114 (MADZA KK) 22 Feb. 1985.

*Primary Examiner*—Tony M. Argenbright
*Attorney, Agent, or Firm*—Knobbe Martens Olson & Bear

[57] ABSTRACT

A two-cycle crankcase compression direct injected internal combustion engine having a combustion chamber formed by a recess in the cylinder head in which a gap of the spark plug extends. The direct fuel injector sprays into this recess and has a first nozzle port that is directed toward the spark plug gap and at least two other nozzle ports that are directed into the recess but above the head of the piston. This achieves good stratification. The timing of the injection is such at least under low load and low speed conditions that the fuel patch will reach the spark plug at about the time it fires. A staged automatically operated throttle valve system is provided for insuring excess air to aid in the stratification and permit lean burn running.

34 Claims, 9 Drawing Sheets

5,553,579

FUEL INJECTION SYSTEM FOR TWO-CYCLE ENGINE

BACKGROUND OF THE INVENTION

This invention relates to a direct fuel injected engine and more particularly to an improved direct fuel injected two-cycle engine and to an air supply system for engines.

Although two-cycle engines have considerable advantages because of their simplicity and their high specific output, the substantial overlap in the scavenge and exhaust port openings give rise to problems in maintaining good emission control and good fuel economy. In order to improve the performance of such engines, it has been proposed to employ direct cylinder injection. However, direct cylinder injection in and of itself may not necessarily meet the more stringent demands for fuel economy and emission control.

Therefore, it is desirable to provide an arrangement wherein there may be accomplished some form of stratification in two-cycle engines that employ direct fuel injection. If the charge can be stratified, then the engine can run on a lean burn principal, particularly at low and mid-range conditions. This offers the opportunity of obtaining the necessary emission and fuel economy performance.

It is, therefore, a principal object of this invention to provide an improved direct fuel injected internal combustion engine.

It is a further object of this invention to provide a fuel injected engine wherein stratification can be accomplished.

It is a still further object of this invention to provide a stratified direct injection two-cycle internal combustion engine.

In order to achieve stratification, particularly at low speeds and low loads, it is desirable to introduce excess air into the combustion chamber. If excess air is introduced properly, the stratification can be further improved and, furthermore, lean burn operation is more feasible. However, if the induction system is designed so as to provide excess air, then this excess air may also be existent under wide open load conditions and can deteriorate performance.

It is, therefore, a still further object of this invention to provide an improved arrangement for facilitating the supply of excess air to an engine under certain desired running conditions.

It is a further object of this invention to provide an improved induction system and throttle control arrangement for an engine that will permit the desired amount of air flow under all running conditions so as to accommodate lean burn under some conditions and stoichiometric operation under full speed full load conditions.

It is a further object of the invention to provide an improved method for supplying air to an engine to accommodate lean burn under some running conditions.

SUMMARY OF THE INVENTION

This invention is adapted to be embodied in a direct fuel injected internal combustion engine having a combustion chamber. A spark plug having a spark gap extends into the combustion chamber and a fuel injector is supported to one side of the spark plug and sprays fuel into the combustion chamber. The fuel spray from the fuel injector is in a direction generally transversely to the spark plug. The fuel injector has a first spray port that is directed toward the spark plug spark gap and at least two other spray ports directed to other areas in the combustion chamber spaced from the spark gap.

Another feature of the invention is adapted to be embodied in a direct fuel injected internal combustion engine having a combustion chamber defined by a piston, a cylinder bore and a cylinder head affixed to and closing the cylinder bore. A spark plug is mounted in a recess in the cylinder head and a fuel injector sprays fuel into the combustion chamber to form a stoichmetric mixture in the area of the spark plug at the time the spark plug is fired and a richer mixture in the area below the spark plug and above the head of the piston to define a larger volume area below the rich mixture that is charger with primarily pure air.

A further feature of the invention is adapted to be embodied in an internal combustion engine and method for operating such an engine that has a combustion chamber and an induction system for supplying at least an air charge to the combustion chamber. This induction system includes a manually operated throttle valve. Means are provided for delivering a fuel charge to the combustion chamber in proportion to the position of the manually operated throttle valve.

In accordance with an apparatus for performing the invention, means are provided for supplying excess air to the combustion chamber in response to certain running conditions.

In accordance with a method of practicing the invention, excess air is provided to the engine under low speed, low load conditions for lean burn operation.

Another feature of the invention is adapted to be embodied in a throttle valve system for the induction system of an internal combustion engine. The throttle valve system includes a valve body having a pair of intake passages. A manually operated throttle valve is provided in one of the intake passages and is adapted to be manually operated for engine speed control.

An automatically positioned throttle valve is provided in the other of the intake passages for controlling the air flow therethrough. A linkage system including a lost motion connection interconnects the manually and automatically operated throttle valves for automatically opening the automatically operated throttle valve when the manually operated throttle valve is opened more than a predetermined degree and for permitting opening and closing of the automatically operated throttle valve independently of the manually operated throttle valve. A servomotor is connected to the automatically operated throttle valve for automatically opening it independently of the position of the manually operated throttle valve in response to engine running conditions.

DETAILED DESCRIPTION OF THE PREFERRED EMBODIMENTS OF THE INVENTION

Figure 1:
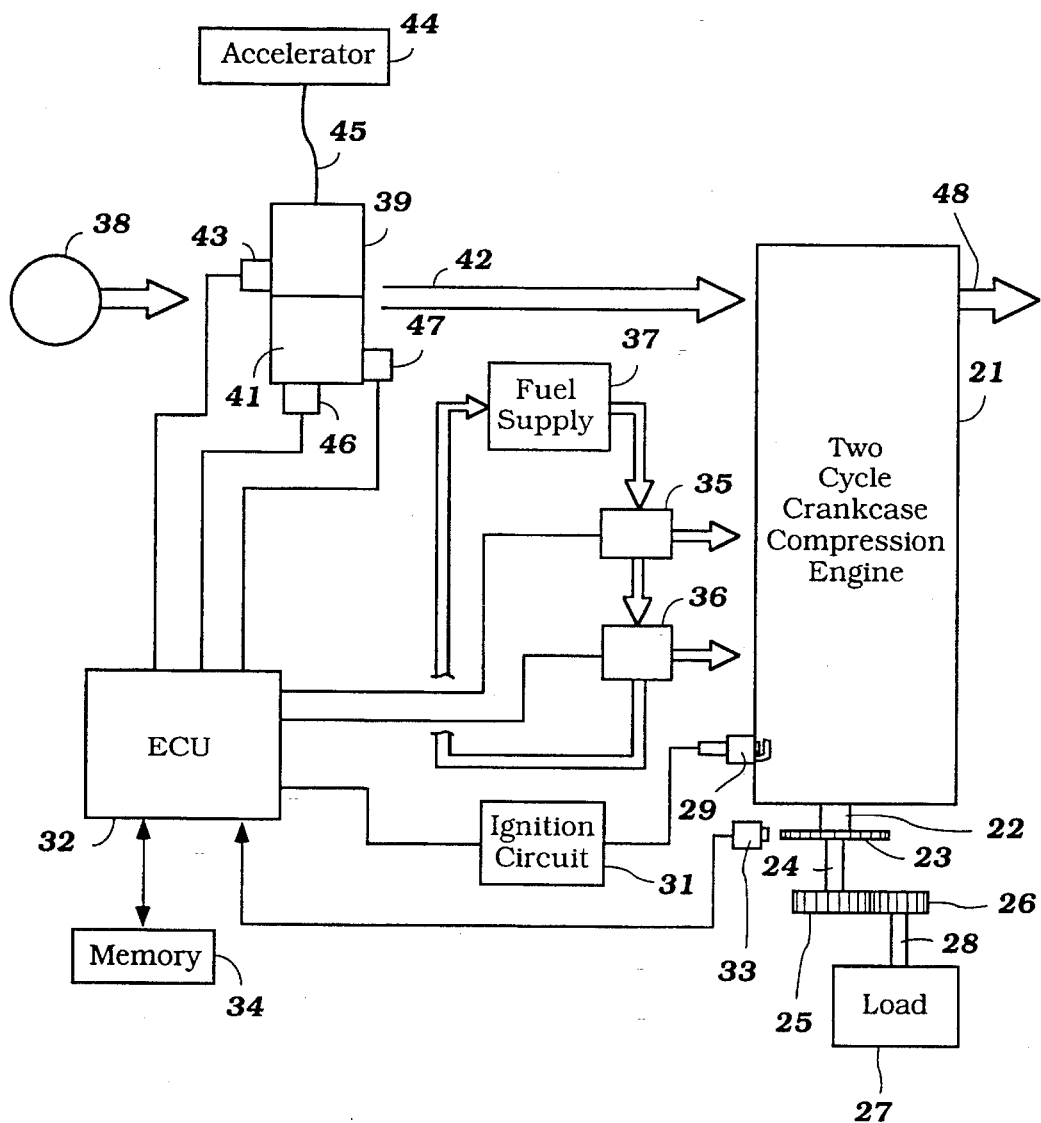
FIG. 1 is a partially schematic view showing a two-cycle internal combustion engine constructed in accordance with an embodiment of the invention.

Referring now in detail to the drawings and initially primarily to FIG. 1, an internal combustion engine is shown schematically and identified generally by the reference numeral 21. The internal details of the construction of the engine 21 will be described later by reference to FIG. 2. The following description is to permit those skilled in the art to understand the overall components of the system and their interrelationship.

The engine 21 is of the two-cycle, crankcase compression type and may be comprised of any number of cylinders including single cylinder engines and having any cylinder orientation. In the illustrated embodiment, the engine 21 is of a three cylinder in-line type.

The engine 21 includes, among other components which will, as noted above, be described later, a crankshaft 22 on which a starter gear 23 is affixed along with a flywheel. A starter (not shown) cooperates with the starter gear 23 for starting the engine 21 as is well known in this art.

The crankshaft 22 drives a transmission input shaft 24 which, in turn, drives any suitable transmission, indicated schematically by the intermeshing gears 25 and 26 so as to drive a load 27 through a drive shaft 28. The load 27 is shown schematically and it may be any load normally driven by the such engines such as the wheels of a motor vehicle, a propulsion unit for a watercraft or the like.

In the illustrated embodiment, the engine 21 is spark ignited and it includes a spark plug 29 for each cylinder and which spark plug is fired by an ignition circuit 31 under the control of an ECU, indicated generally by the reference numeral 32. A pulser coil 33 is associated with the flywheel starter gear 23 and outputs a pulse signal to the ECU 32 indicative of engine rotation speed and also crankshaft angle. The ECU 32 also has a memory, indicated by the reference numeral 34 that contains certain preset maps, some of which will be discussed below, for controlling not only the timing and firing of the ignition circuit 31 and also other components as will be described.

The engine 21 is of the fuel injected type and actually includes, in the preferred embodiments, two fuel injectors which are also indicated schematically in FIG. 1 and these comprise a cylinder head fuel injector 35 and a through the cylinder fuel injector 36. These fuel injectors 35 and 36 receive regulated fuel under pressure from a fuel supply system, shown schematically at 37. As is well known, this fuel supply 37 maintains a substantially constant fuel pressure supply to the injectors 35 and 36 with the pressure being regulated by dumping excess pressure back to the fuel tank of the supply system 37.

The fuel supplied by the injectors 35 and 36 is mixed with air that is delivered by an induction system that includes an air inlet device 38 which draws atmospheric air and which delivers it to a throttle body assembly comprised of a manually operated throttle valve 39 and an automatically operated throttle valve 41. This air is then delivered to an intake manifold shown schematically in FIG. 1 and indicated at 42.

There is provided a position sensor 43 that senses the position of the manually operated throttle valve 39, which is actuated by means of a remotely positioned accelerator pedal 44 through a wire actuator 45. This position of the manual throttle valve 39 is indicative of load or operator demand and is delivered to the ECU 32.

The automatically operated throttle valve 41 is operated by means of a servomotor, indicated generally by the reference numeral 46 under the control of the ECU 32 in accordance with a control routine as will be described later. A position sensor 47 provides a signal back to the ECU 32 to confirm that the automatic throttle valve 41 is in its appropriate position.

Finally, and still referring to the schematic view of FIG. 1, the combustible charge which has been burned in the engine combustion chamber is discharged to the atmosphere through an exhaust system, indicated schematically at 48.

Figure 2:
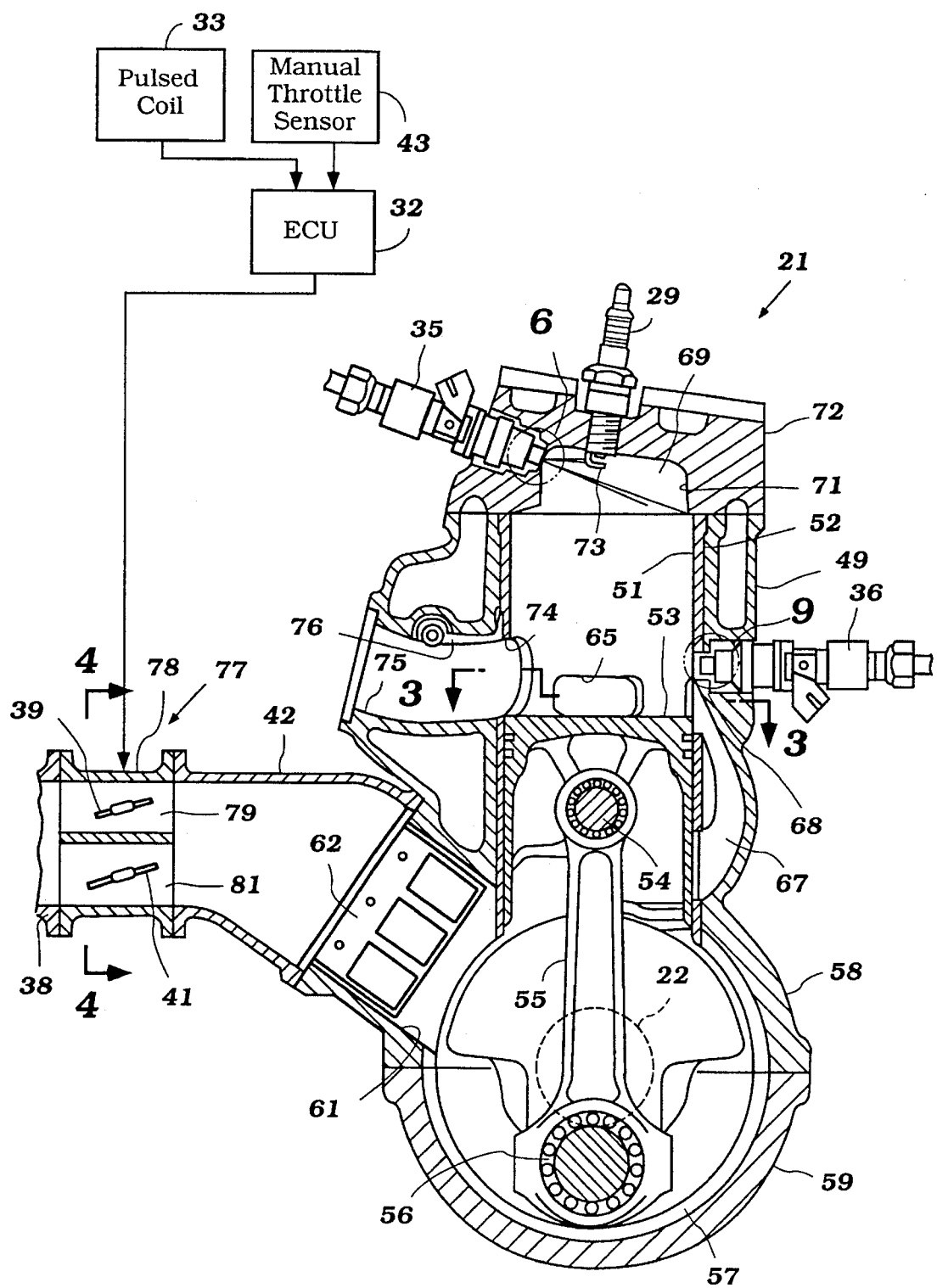
FIG. 2 is an enlarged cross-sectional view taken through a single cylinder of the engine and showing certain of the control components schematically.
Figure 3:
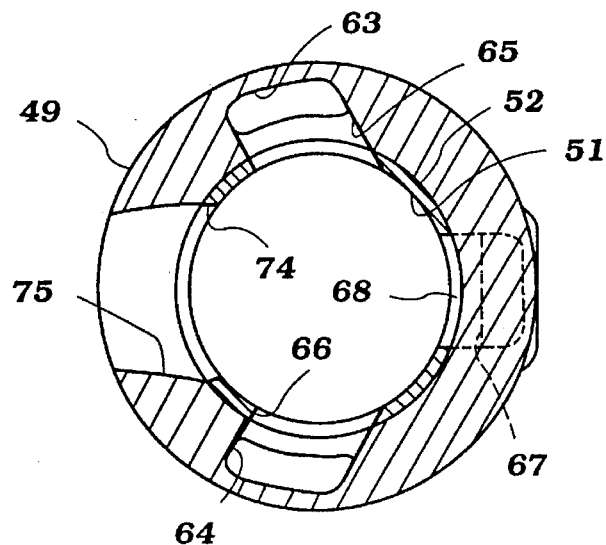
FIG. 3 is a cross-sectional view taken along the line 3—3 of FIG. 2 and shows the scavenging and exhaust port relationships.

The actual physical construction of the engine 21 will be described in more detail now by reference initially to FIGS. 2 and 3. In these figures, components which have been indicated schematically in FIG. 1 are identified by the same reference numerals.

The engine 21 includes a cylinder block 49 in which one or more cylinder bores 51 are formed by pressed or cast-in liners 52. As has been previously noted, the engine 21 may be of the three cylinder in-line type and if that is the case there are three in-line cylinder bores 51.

Pistons 53 are slidably supported in each of the cylinder bores 51 and are connected by piston pins 54 to the small end of connecting rods 55. The connecting rods 55 have their big ends journaled on individual throws 56 of the aforenoted crankshaft 22. The crankshaft 22 is rotatably journaled within a crankcase chamber 57 formed by a skirt 58 of the cylinder block 49 and a crankcase member 59 that is affixed thereto in any known manner. As is typical with two-cycle crankcase compression engines, the crankcase chamber 57 associated with each of the cylinder bores 51 is sealed from the others in a suitable manner.

An air charge is delivered to the individual crankcase chambers 57 through an intake port 61 formed in a side of the cylinder block skirt 58. The induction system which includes the air inlet device 38, throttle valves 39 and 41 and the intake manifold 42 supplies an air charge to the intake port through reed-type check valve assemblies 62. The reed-type check valve assemblies permit the air to flow into the crankcase chambers 57 when the piston 53 is moving upwardly. On the other hand, these check valve assemblies 62 close when the pistons 63 move downwardly so as to compress the charge in the crankcase chamber 57.

The compressed charge is transferred to the area above the piston 53 through a scavenging system. Although various types of scavenging systems can be employed, in this embodiment, the scavenging systems of the Schnurl type and includes a pair of side scavenge passages 63 and 64 which extend on diametrically opposite sides of the cylinder bore 51 and which terminate in respective scavenge ports 65 and 66 that extend through the cylinder block 49 and cylinder liner 52. In addition, there is provided a center scavenge passage 67 which terminates in a center scavenge port 68 that is disposed between the side scavenge port 65 and 66.

The charge transferred to the area above the piston 53 through the scavenging system as thus far described enters a combustion chamber, indicated generally by the reference numeral 69 and which is formed by the head of the piston 53, the cylinder bore 51 and a recess 71 of a cylinder head assembly 72 that is affixed to the cylinder block 49 in any known manner. A fuel air charge which has been mixed in the combustion chamber 69 in a manner which will be described is fired by the firing of the spark plug 29 which is mounted in the cylinder head 72 and has a spark gap 73 disposed in the cylinder head recess 71. This causes the mixture to ignite, burn and expand to drive the piston 53 downwardly.

The charge which it has burned is expelled through an exhaust port 74 which is formed in the cylinder liner 52 in registry with an exhaust passage 75 that is formed in the cylinder block 49 and which communicates with the aforenoted exhaust system, indicated schematically in FIG. 1 at 48. The exhaust port 74 faces the center scavenge port 68.

An exhaust control valve, indicated generally by the reference numeral 76, may be positioned in the exhaust passage 75 in an area to occlude a portion of the upper edge of the exhaust port 74 for varying the compression ratio of the engine 21 in a manner as known in this art. Since this type of construction forms no part of this invention, a further description of it is not believed to be necessary.

The system for controlling the air flow into the combustion chambers and its interrelationship with the fuel injectors 35 and 36 will now be described by continued reference to FIGS. 1 and 2 and additionally by reference to FIGS. 4–9. The control strategy will be described in conjunction with FIGS. 10–12 after the actual physical structure has been described.

The throttle control system which cooperates to provide excess air will now be described by particular reference to FIGS. 2, 4, and 5 and this mechanism which includes the manually operated throttle valve 39 and the automatically operated throttle valve 41 is identified generally by the reference numeral 77. This assembly includes an outer housing 78 that receives air from the air inlet device 38 and transmits it to the intake manifold 42. The outer housing 78 forms a pair of flow passages 79 and 81 in which the throttle valves 39 and 41 are supported on respective throttle valve shafts 82 and 83. The flow passage 81 is larger than the flow passage 79.

As has been noted, the manually operated throttle valve 39 is operated from the accelerator 44 (FIG. 1) through a bowden wire actuator 45. To accomplish this, an actuating sector 84 is affixed for rotation with the throttle valve shaft 82 and is provided with a groove 85 in which the wire actuator 45 is received. At one end of the groove 85 there is provided an attachment device 86 so as to receive a fastener affixed to the end of the wire actuator 45 for rotating the throttle valve 39 from its closed or idle position, as shown in phantom line in FIG. 5, toward an opened position. Either an oppositely acting wire or a return spring urges the manually operated throttle valve to its closed position.

Figure 4:
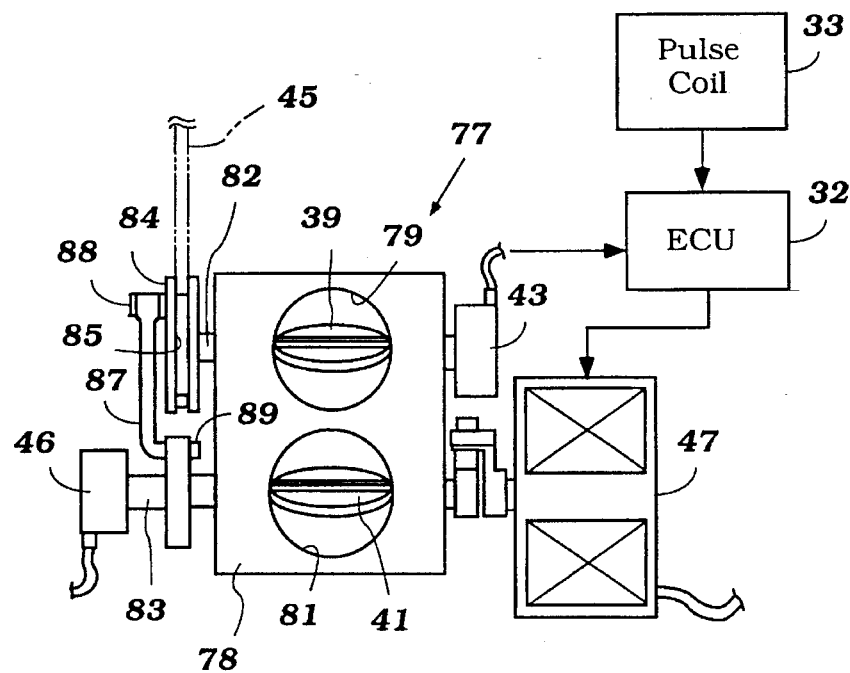
FIG. 4 is a cross-sectional view taken along the line 4—4 of FIG. 2 and shows the throttle valve arrangement that permits the use of excess air.
Figure 5:
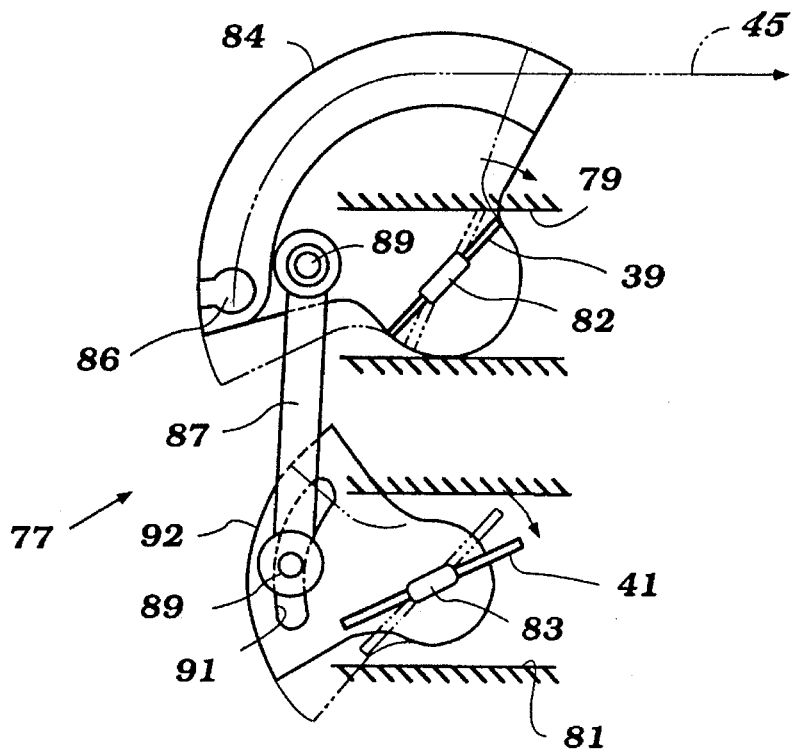
FIG. 5 is a side elevational view of the throttle mechanism, with portions broken away and shown in section.

As has been noted, the throttle valve 41 is operated by the servomotor 49, but a linkage arrangement shown in FIGS. 4 and 5 is provided between the throttle valves 39 and 41, and specifically their shafts 82 and 83, for limiting the degree of opening and closing movement of the throttle valve 41 relative to the position of the manually operated throttle valve 39, for permitting independent positioning of the throttle valve 42 within this limited range, and also for manually opening the throttle valve 42 under certain conditions as will be described.

This linkage system is comprised of a link 87 that has a pivotal connection to the actuating sector 84 by means of a pivot pin 88. The opposite end of the link 87, which end is indicated by the reference numeral 89, is received in a slot 91 formed in a sector lever 92 that is fixed for rotation with the automatically operated throttle valve shaft 83. The sequence of operation of the throttle valves 39 and 41 will be described later by reference to FIG. 12. However, as has been noted, the automatically operated throttle valve 41 is operated under a certain stage of operation automatically so as to provide excess air for the running under low and mid-range conditions.

Figure 6:
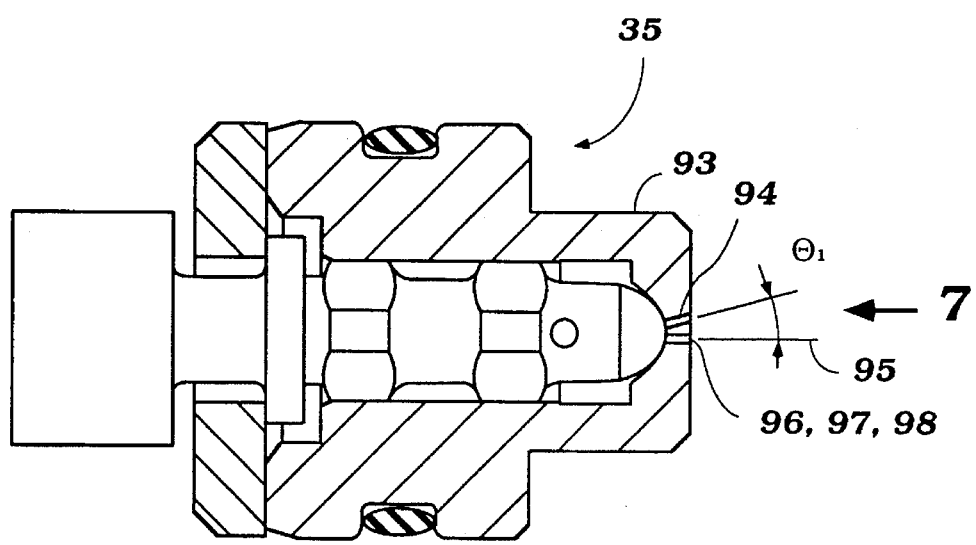
FIG. 6 is an enlarged view of the area encompassed by the circle 6 in FIG. 2 and shows the cylinder head injector.
Figure 7:
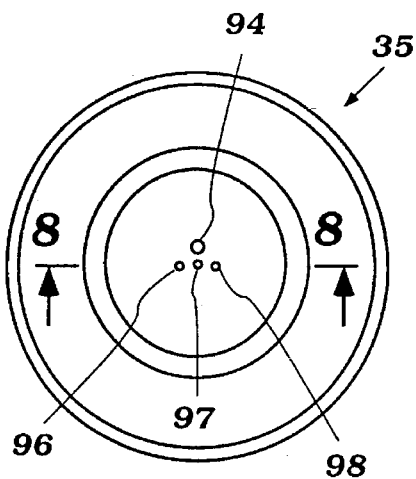
FIG. 7 is a view looking in the direction of the arrow 7 of FIG. 6 and shows the nozzle ports of the cylinder head fuel injector.
Figure 8:
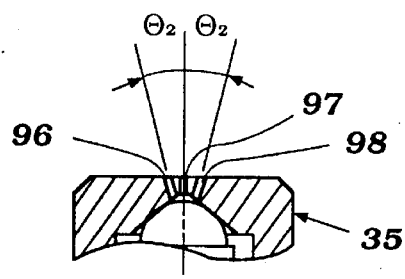
FIG. 8 is a cross-sectional view taken along the line 8—8 of FIG. 7.

The construction of the cylinder head fuel injector 35 will now be described by particular reference to FIGS. 6–8. The injector 35 may be of any known high-pressure type suitable for direct cylinder injection. However, the injector 35 is provided with a nozzle portion 93 that is mounted in the cylinder head 72 in an appropriate manner and which has its spray ports, to be described shortly, directed to spray transversely across the cylinder head recess 69.

These spray ports include a first stratification spray port 94 which is disposed so as to inject at an angle $\theta_1$ (FIG. 6) to a plane 95 in which the remaining spray nozzle ports 96, 97, and 98 are formed. In this embodiment, the spray ports 96, 97, and 98 all lie in a common plane and are disposed at equal angles $\theta_2$ from a vertical plane containing the axis of the stratification nozzle port 94 and the center port 97. As may be seen in FIG. 2, this causes the fuel from the port 94 to be directed at the spark gap 73. On the other hand, the spray from the ports 96, 97, and 98 is in a generally fan pattern and is disposed between the spark gap 73 and the head of the piston 53 but well above the scavenge ports 65, 66 and 68. This provides a fuel distribution within the combustion chamber, as will be described by reference to FIG. 11.

Figure 9:
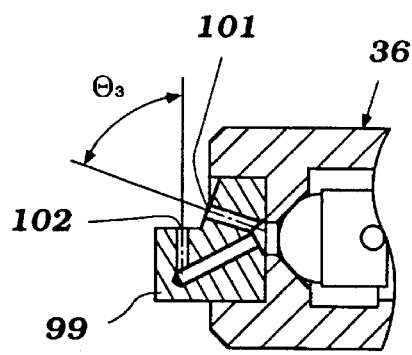
FIG. 9 is an enlarged cross-sectional view of the area encompassed by the circle 9 in FIG. 2 and shows the spray arrangement for the cylinder liner injector nozzle.

The in-cylinder injector 36 is shown in most detail in FIG. 9, and it also may be of any known type that sprays high-pressure fuel and which may be electronically controlled. This injector has a nozzle portion 99 that is mounted in the cylinder block 49 and extends through an opening in the liner 52 immediately adjacent the upper peripheral edge of the center scavenge port 68. This nozzle portion 99 defines a first port 101 which sprays in a direction that is disposed at an angle $\theta_3$ to the vertical and/or to the cylinder bore 53. This spray will be directed centrally into the cylinder bore and upwardly toward the cylinder head recess 71. In addition, a further vertically extending spray port 102 is provided that will spray in a direction generally upwardly parallel to the cylinder bore 51 toward the cylinder head 72. This spray will be carried by the scavenge air flow from the intake passage 67 generally upwardly in the scavenging pattern. The spray from the nozzle port 101 will penetrate more deeply into the cylinder and will be mixed therein.

The operation is such that the timing of the injectors 35 and 36 will depend upon engine speed and load ranges; and at idle and low-speed running, the timing of the injection from the injector 35 will be delayed so that the fuel patch sprayed by its nozzle port 94 will pass through the spark gap 73 at the time when the spark plug 29 is being fired. Also, this will ensure that there is a stoichiometric mixture present at the spark gap at the time of firing. This thus permits lean burning, but will also ensure complete combustion and total combustion of the fuel discharged into the combustion chamber by the injectors 35 and 36. This late injection and its direction will reduce the amount of fuel which will pass below the cylinder head recess 71 and will maintain a rich mixture in this recess.

Figure 10:
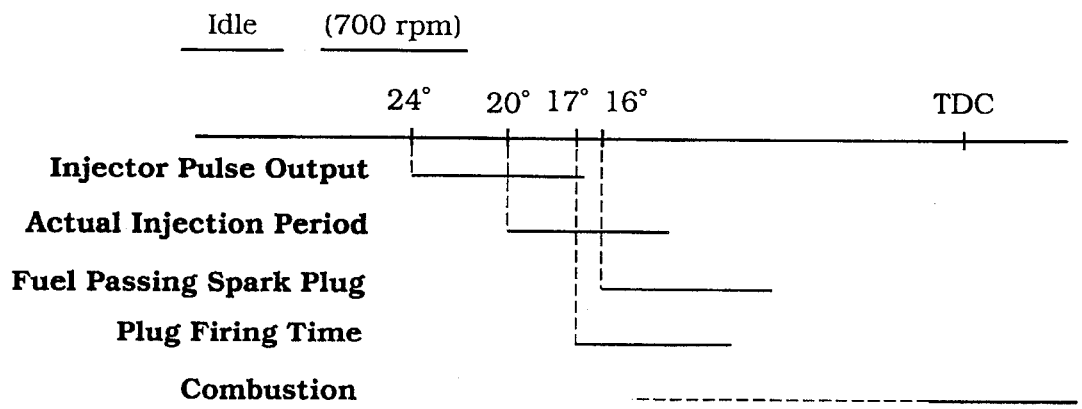
FIG. 10 is a timing diagram showing certain of the events so as to explain the principal of operation of the invention.
Figure 11:
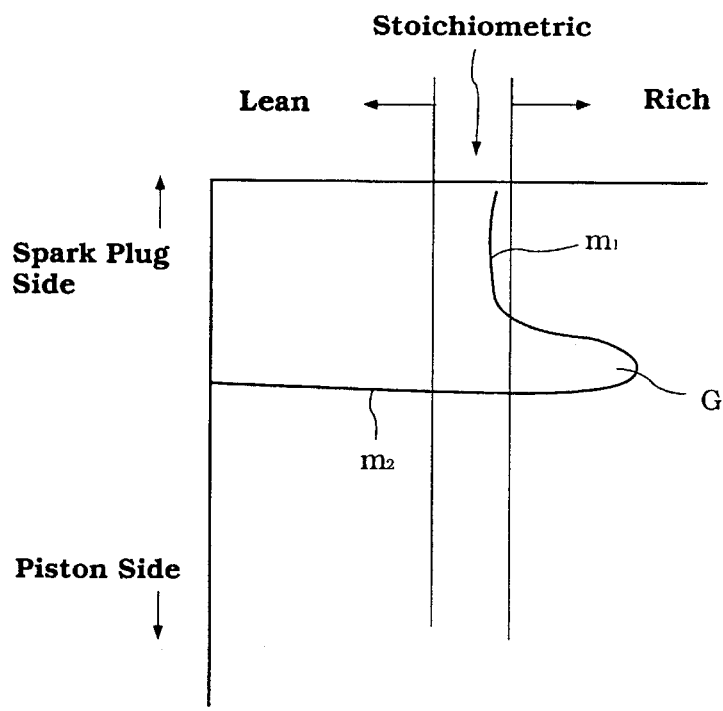
FIG. 11 is a diagram showing the mixture strength throughout the combustion chamber when operating on a stratified principal.

Referring now to FIGS. 10 and 11, these show the condition during idle, with FIG. 10 being a timing diagram and FIG. 11 being a diagram showing the fuel distribution and mixture strength within the combustion chamber. It should be noted that the size of the injector ports 94, 96, 97, and 98 is such that the amount of fuel $Q_1$ injected from the spark plug directed stratification port 94 during a given time period is smaller than the amount of fuel $Q_2$ flowing from the remaining injection ports 96, 97, and 98. The incremental fuel flow per period of time from the ports is indicated as $q_1$ and $q_2$, respectively. The timing of injection is done so that, as discussed above, the fuel patch injected by the stratification nozzle 94 will pass through the spark plug gap 73 at the time when the spark plug is being fired and be substantially maintained in the cylinder head recess.

This will result in a mixture distribution, as shown in FIG. 11, with there being no substantial fuel in the cylinder below the line $m_2$ (the injector 36 injects no fuel at idle) this being the lower end of the recess 71; and a rich mixture will be disposed in the area between the injector ports 96, 97, and 98, tapering off to stoichiometric in the area $m_1$ adjacent the spark gap 32. Thus in viewing the combustion chamber from the cylinder head recess to the piston, there is first a stoichmetric charge present at the gap of the spark plug at the time it is fired and a richer than stoichametric fuel mixture below the spark gap but above the head of the piston. The area above the line $m_2$ defines a volume that is smaller than the volume below the line. This causes the flame to propagate in a manner which will be described below.

It may be seen that the spark plug timing is such that the plug begins firing at idle at approximately 17° before top dead center. The fuel injector 35 is provided with an actuator pulse from the ECU 32 at approximately 24° before top dead center. However, due to the inertia in the system, the actual fuel injection does not begin until approximately 20° before top dead center. This fuel then travels across and does not reach the area where the spark plug gap 73 is until approximately 16° before top dead center, slightly after the beginning of the spark firing. This earlier spark timing ensures some tolerance in the system and also permits the spark to be well established by the time the fuel reaches the spark gap. Then combustion initiates very shortly after the fuel passes the spark gap at 16° before top dead center.

Since there is a stoichametric charge present when the spark plug is fired, combustion will initiate and will propogate down toward the richer fuel air mixture below the spark gap. This heats and vaporizes the greater volume of fuel in the area $m_2$ and this will be compressed further by the surrounding rich pure air below it so as to insure that the fuel that is directed in the intermediate range is burned slowly and at a low temperature. Thus, stable stratified combustion is generated and NOx emissions are substantially reduced.

The strategy for opening the automatically operated throttle valve 41 will now be described by reference to FIG. 12 and also to FIG. 1 to show the component association. As has been noted, the throttle valve 39 is manually actuated, and its opening follows the curve J in this figure and is independent of the automatic operation.

However, as has been noted, the ECU receives a signal from the manual throttle valve sensor 43, and this signal is indicative of load. In addition, the pulser coil 33 indicates a condition of engine speed, and the memory 34 is preprogrammed with maps, such as the maps L and M, to provide for opening of the automatic throttle valve 41 at a degree preprogrammed.

Figure 12:
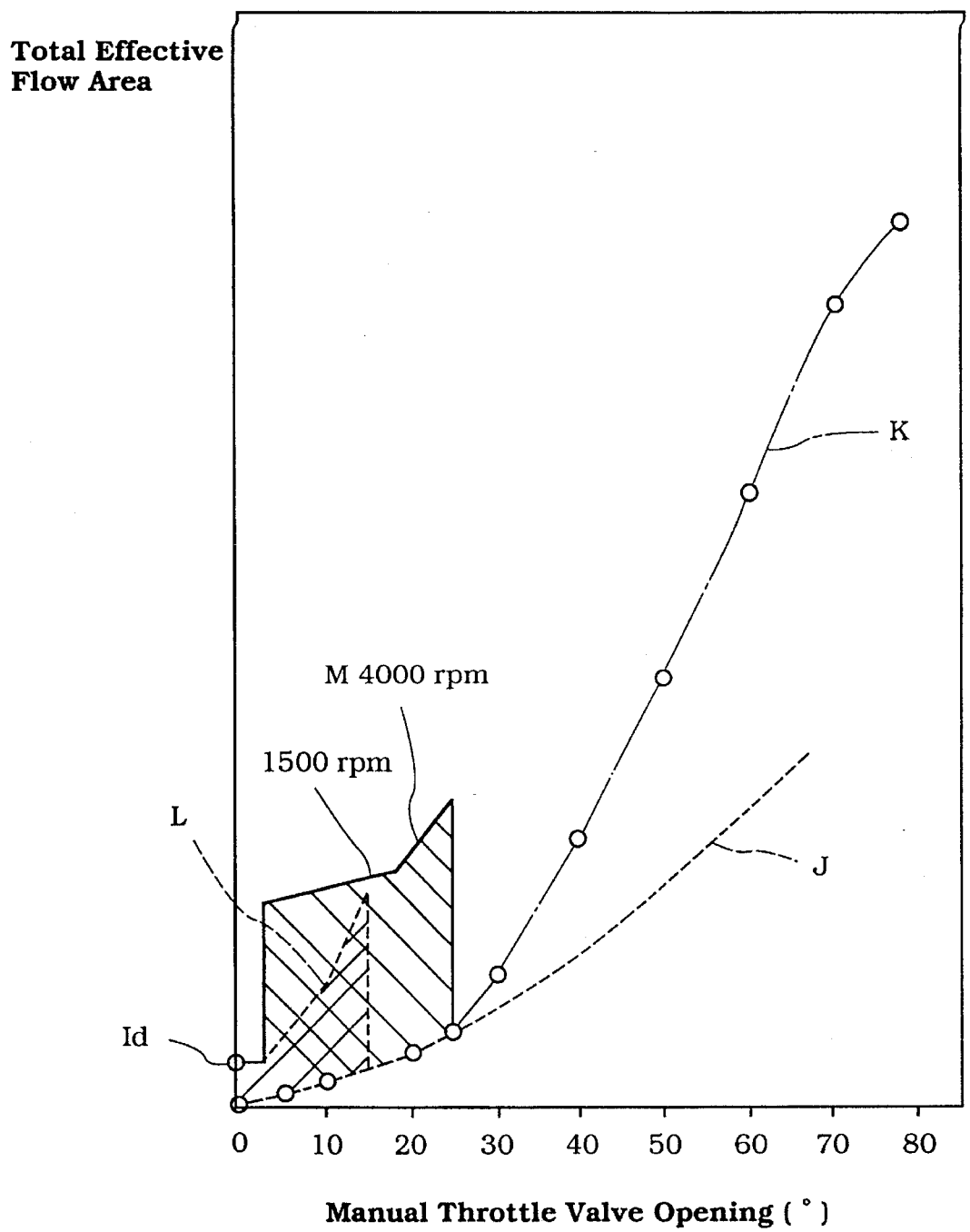
FIG. 12 is a view showing the throttle valve position of the main and excess air throttle valves under varying running conditions in relation to actual throttle valve opening.

FIG. 12 shows the curve L when the engine speed is at 1500 rpm and the load varies dependent upon opening of the manual throttle valve. It will be seen that as the device moves off idle, the automatic throttle valve 41 is opened relatively rapidly up to a given point and held there until manual throttle opening is about 15°. This provides a much larger effective flow area, and this flow will provide additional air so as to ensure a lean mixture. The additional air flow also aids in the stratification by ensuring that the fuel charge is concentrated in the upper area of the combustion chamber around the spark plug and above the head of the piston.

The curve M shows the condition when the engine speed is held constant at 4000 rpm, and the manual throttle valve is opened. It will be seen that there is a step function in the curve here to provide excess air.

The curve K indicates the curve that will occur when the automatic system ceases to operate and the throttle valve 41 is opened by the linkage system. It will be seen that this permits added air flow from that of the throttle valve 39 alone, as should be readily apparent. The linkage arrangement operates such that both throttle valves 39 and 41 will be opened in their full throttle positions at the same time during this mechanical actuation phase.

Under most operating conditions, the ECU 32 controls the fuel injectors 35 and 36 so that the fuel injector 35 supplies all of the fuel under the low and mid-range performance conditions. As the engine moves into the higher load range, then the fuel injector 36 begins to inject additional fuel so as to satisfy the high load requirements of the engine.

In the embodiment as thus far described, there has been provided one stratification nozzle port 94 and three main nozzle ports 96, 97, and 98 that all discharge on substantially the same plane in a fan pattern. Other types of spray patterns may be employed, and the remaining figures show some alternative arrangements. In each instance, however, it should be noted that there is provided one nozzle port that is a stratification port and which is directed at the gap 73 of the spark plug 29 and other ports that are directed toward the area below the spark gap and above the head of the piston within the cylinder head recess. Since the basic construction of the engine in these other embodiments is substantially the same, it will not be described again in detail. However, it should be readily apparent to those skilled in the art that the particular spray pattern chosen will be to some extent determined by the overall shape of the combustion chamber.

Figure 13:
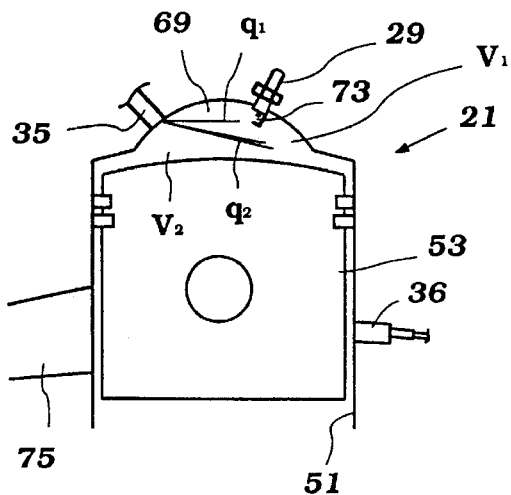
FIG. 13 is a partially schematic view showing the spray pattern of another embodiment of cylinder head fuel injector nozzle.
Figure 14:
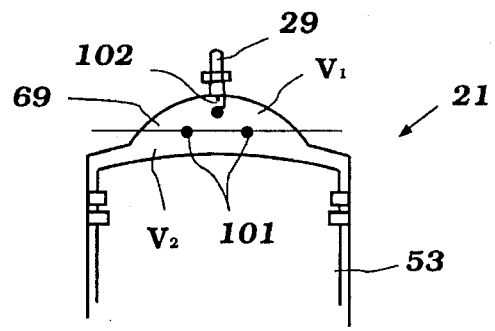
FIG. 14 is a view taken in the direction of the line 14—14 of FIG. 13.

It will be seen in these figures that the combustion chamber volume is divided into a first volume portion $V_1$ which is disposed above the spray pattern $Q_2$ from the lowermost injection nozzle portions and a second volume $V_2$ which is disposed below this spray. The stratification nozzle spray is indicated at $q1$. In the first alternative embodiment of FIGS. 13 and 14, the lower nozzle ports are indicated at 101, and there are two such ports that are disposed on opposite sides of the stratification nozzle port 102 at substantially equal distances. Thus, this embodiment is the same as that described in FIGS. 1–12, but the center nozzle port 97 is eliminated.

Figure 15:
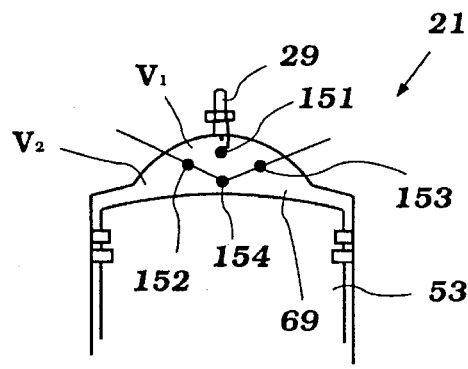
FIG. 15 is a view, in part similar to FIG. 14, and shows another type of spray pattern which may be employed in conjunction with the invention.
Figure 16:
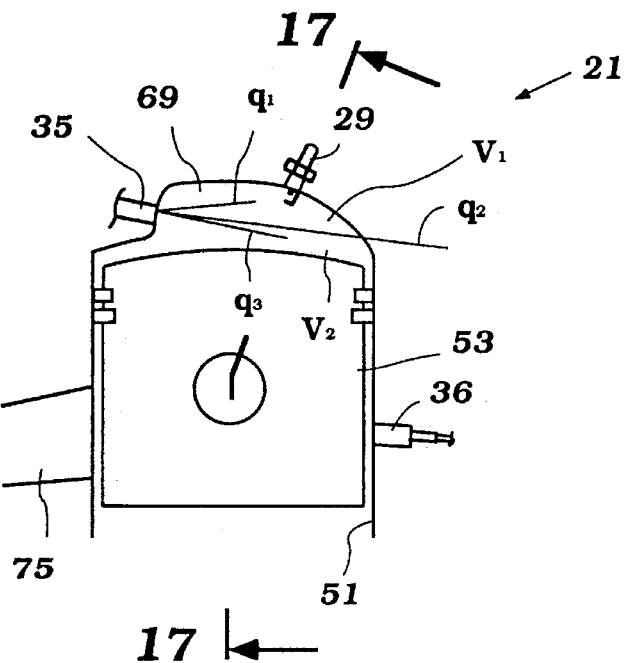
FIG. 16 is a view in part similar to FIG. 13 and shows another possible spray pattern.

FIGS. 15 and 16 show another arrangement wherein the spray pattern from the non-stratification nozzle ports is in a somewhat V-shaped fashion. In this embodiment, there is a stratification nozzle port 151 which is disposed between a pair of side nozzle ports 152 and 153 and which are disposed above a lower port 154. Hence, there will be a somewhat bent fan shape from this nozzle arrangement, and the area $V_2$ below that circumscribed by the nozzle ports 152, 153, and 154 will have no fuel present except under higher speed and load conditions when the cylinder injector 36 is supplying fuel.

Figure 17:
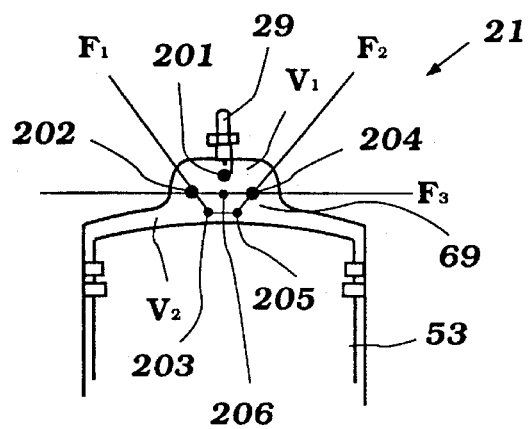
FIG. 17 is a cross-sectional view taken along the line 17—17 of FIG. 16.

A further spray pattern is shown in FIGS. 16 and 17, and this again embodies a stratification port 201 that sprays directly into the spark gap of the spark plug 29 in an amount $q_1$. There are provided five additional injection ports comprised of a pair of injection ports 202 and 203 and a pair of injection ports 204 and 205 which are disposed along lines $F_1$ and $F_2$ in FIG. 17 which define a truncated V inasmuch as the ports 203 and 205 are circumferentially spaced from each other and on a generally horizontal plane. The nozzle ports 202 and 204 are disposed on a further plane $F_3$, and between them there is provided a fifth nozzle port 206. Thus, this system may be considered to be substantially the same as the first embodiment, with the nozzle ports 202, 206, and 204 discharging an amount of fuel $Q_2$ while the nozzle ports 203 and 205 may supply a somewhat leaner amount of fuel $Q_3$.

It should be readily apparent from the foregoing description that the described embodiments of the invention provide a very effective fuel injection system for a two-cycle crankcase compression engine wherein good stratification can be achieved and the amount of excess air is controlled so as to achieve lean burn operation and good fuel economy and emission control. The performance at wide open throttle and mid-range is, however, not at all deteriorated with this type of arrangement.

Of course, the foregoing description is that of preferred embodiments of the invention, and various changes and modifications may be made without departing from the spirit and scope of the invention as defined by the appended claims.

We claim:

1. A direct fuel injection system for an engine having a combustion chamber at an upper end thereof, a spark plug having a spark gap extending into said combustion chamber, and a fuel injector supported to one side of said spark plug and spraying fuel into said combustion chamber in a direction generally transverse to said combustion chamber and said spark plug, said fuel injector having a first spray port directed toward said spark plug gap and at least two other spray ports directed in an area in said combustion chamber spaced from said spark gap.

2. A direct fuel injection system as in claim 1, wherein the engine is a reciprocating engine comprised of a cylinder bore, a piston reciprocating in the cylinder bore, and a cylinder head affixed to the cylinder bore and closing the cylinder bore.

3. A direct fuel injection system as in claim 1, wherein the spark plug and the fuel injector are mounted in the cylinder head.

4. A direct fuel injection system as in claim 3, wherein the other spray ports spray into the area between the head of the piston and the spark plug gap.

5. A direct fuel injection system as in claim 4, wherein the other spray ports spray at least in part on opposite sides of the spark gap.

6. A direct fuel injection system as in claim 3, wherein the engine is a two-cycle crankcase compression internal combustion engine.

7. A direct fuel injection system as in claim 6, wherein the lower cylinder head surface has a recess into which the injection nozzle sprays and in which the spark gap is positioned.

8. A direct fuel injection system comprised of a cylinder bore, a piston reciprocating in the cylinder bore, and a cylinder head affixed to the cylinder bore and closing the cylinder bore to form a combustion chamber, a spark plug having a spark gap mounted in said cylinder head and extending into said combustion chamber, and a fuel injector supported in said cylinder head to one side of said spark plug and spraying fuel into said combustion chamber in a direction generally transverse to said spark plug, said fuel injector having a first spray port directed toward said spark plug gap and at least two other spray ports directed in an area in said combustion chamber spaced from said spark gap, said other spray ports spraying into different vertical positions within said combustion chamber.

9. A direct fuel injection system as in claim 8, wherein the other spray ports spray in a generally V-shaped pattern.

10. A direct fuel injection system as in claim 8, wherein the other spray ports spray in a pattern having a generally U-shape.

11. A direct fuel injection system as in claim 10, wherein the other spray ports include a further spray port spraying into the area of the U-shape below the spark gap and substantially in line with the one spray port.

12. A direct fuel injection system comprised of a cylinder bore, a piston reciprocating in the cylinder bore, and a cylinder head affixed to the cylinder bore and closing the cylinder bore to form a combustion chamber, said cylinder head having a recessed lower surface, a spark plug mounted in said cylinder head and having a spark gap extending into said recess, and a fuel injector supported in said cylinder head recess to one side of said spark plug and spraying fuel into said combustion chamber in a direction generally transverse to said spark plug, said fuel injector having a first spray port directed toward said spark plug gap and at least two other spray ports directed in an area in said combustion chamber spaced from said spark gap, and a scavenge port formed in said cylinder bore diametrically opposite the direction of spray from the fuel injector.

13. A direct fuel injection system as in claim 12, wherein the spark plug and the fuel injector are mounted in the cylinder head.

14. A direct fuel injection system as in claim 13, wherein the other spray ports spray into the area between the head of the piston and the spark plug gap within the cylinder head recess.

15. A direct fuel injection system as in claim 14, wherein the other spray ports spray at least in part on opposite sides of the spark gap.

16. A direct fuel injection system as in claim 15, wherein the other spray ports spray into different vertical positions within the cylinder head recess.

17. A direct fuel injection system as in claim 16, wherein the other spray ports spray in a generally V-shaped pattern.

18. A direct fuel injection system as in claim 16, wherein the other spray ports spray in a pattern having a generally U-shape.

19. A direct fuel injection system as in claim 18, wherein the other spray ports include a further spray port spraying into the area of the U-shape below the spark gap and substantially in line with the one spray port.

20. A direct fuel injection system as in claim 12, further including throttle valve means for controlling the air flow into a crankcase chamber which serves the scavenge port, said throttle valve means providing excess air flow under low-speed, low-load conditions.

21. A direct fuel injection system as in claim 20, wherein the throttle valve means comprises a first manually operated throttle valve and a second automatically operated throttle valve.

22. A direct fuel injection system as in claim 21, wherein the automatically positioned throttle valve is opened more rapidly than the manually positioned throttle valve up until a predetermined opening of the manual throttle valve depending upon engine speed and load.

23. A direct fuel injection system as in claim 12, further including a second fuel injector disposed in the cylinder bore adjacent the upper end of the scavenge passage.

24. A direct fuel injection system as in claim 23, wherein the second fuel injector has at least one nozzle port for spraying fuel vertically along the side of the cylinder bore.

25. A direct fuel injection system as in claim 24, further including throttle valve means for controlling the air flow into a crankcase chamber which serves the scavenge port, said throttle valve means providing excess air flow under low-speed, low-load conditions.

26. A direct fuel injection system as in claim 25, wherein the throttle valve means comprises a first manually operated throttle valve and a second automatically operated throttle valve.

27. A direct fuel injection system as in claim 26, wherein the automatically positioned throttle valve is opened more rapidly than the manually positioned throttle valve up until a predetermined opening of the manual throttle valve depending upon engine speed and load.

28. A direct fuel injection system for an internal combustion engine having a combustion chamber defined by a piston, a cylinder bore in which said piston reciprocates and a cylinder head affixed and closing one end of said cylinder bore and defining a recess above said piston, a fuel injector for spraying fuel into said cylinder head recess for establishing a stoichiometric mixture at the gap of said spark plug at the time said spark plug is fired and a richer than stoichiometric mixture below said spark plug gap and above the head of said piston, the volume of said combustion chamber below said richer than stoichiometric mixture being greater than the volume above and containing the richer than stoichiometric mixture and being charged with substantially pure air.

29. A direct fuel injection system as in claim 28, further including an air induction system for introducing air into the combustion chamber, said air introduction system including a manually operated throttle valve, means for sensing the position of said manually operated throttle valve for controlling the amount of fuel supplied by said fuel injector, and means for introducing excess air into said combustion chamber under low speed and low load conditions.

30. A direct fuel injection system as in claim 29, wherein the means for introducing excess air comprises a further intake passage for serving the combustion chamber having an automatically positioned throttle valve therein.

31. A direct fuel injection system as in claim 30, wherein the automatically operated throttle valve is opened by a servomotor in response to the low speed low load conditions.

32. A direct fuel injection system as in claim 31, further including a linkage means for interconnecting the manually positioned throttle valve with the automatically positioned throttle valve for limiting the degree of opening of the automatically positioned throttle valve in response to the position of the manually positioned throttle valve and for effecting opening movement of said automatically operated throttle valve when said manually operated throttle valve is opened more than a predetermined degree.

33. An internal combustion engine having a combustion chamber and an induction system for supplying at least an air charge to said combustion chamber including a manually operated throttle valve, means for delivering a fuel charge to said combustion chamber in proportion to the position of said manually operated throttle valve, and means for introducing excess air into said combustion chamber in response to certain engine operating conditions comprising a further intake passage for serving said combustion chamber having an automatically positioned throttle valve therein, said automatically operated throttle valve being operated by a servomotor in response to the certain engine operating conditions, and a linkage means for interconnecting said manually positioned throttle valve with said automatically positioned throttle valve for limiting the degree of opening of the automatically positioned throttle valve in response to the position of said manually positioned throttle valve and for effecting opening movement of said automatically operated throttle valve when said manually operated throttle valve is opened more than a predetermined degree.

34. An induction system for an internal combustion engine comprised of a first intake passage, a manually operated throttle valve positioned in said first intake passage for controlling the flow therethrough, a second intake passage, an automatically positioned throttle valve positioned in said second intake passage for controlling the flow therethrough, and a servomotor for operating said automatically positioned throttle valve in response to an engine condition and a linkage means for interconnecting the manually positioned throttle valve with the automatically positioned throttle valve for limiting the degree of opening of the automatically positioned throttle valve in response to the position of the manually positioned throttle valve and for effecting opening movement of said automatically operated throttle valve when said manually operated throttle valve is opened more than a predetermined degree.

* * * * *

UNITED STATES PATENT AND TRADEMARK OFFICE
CERTIFICATE OF CORRECTION

PATENT NO. : 5,553,579

DATED : September 10, 1996

INVENTOR(S) : Takao Yoshidda, Takahiro Suzuki & Ryoichi Hirai

It is certified that error appears in the above-identified patent and that said Letters Patent is hereby corrected as shown below:

On the title page, item [75]

Inventor #2: should read as --Takahiro Suzuki--;
Inventor #3: should read as --Ryoichi Hirai--.

Signed and Sealed this

Twenty-third Day of September, 1997

Attest:

BRUCE LEHMAN

Attesting Officer

Commissioner of Patents and Trademarks